(12) United States Patent
Yasunaga et al.

(10) Patent No.: US 8,771,877 B2
(45) Date of Patent: Jul. 8, 2014

(54) POSITIVE ELECTRODE MATERIAL FOR NONAQUEOUS ELECTROLYTE SECONDARY BATTERY, NONAQUEOUS ELECTROLYTE SECONDARY BATTERY INCLUDING THE SAME, AND METHOD FOR PRODUCING THE SAME

(75) Inventors: Yoshinobu Yasunaga, Kyoto (JP); Akihiro Fujii, Kyoto (JP); Tokuo Inamasu, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 843 days.

(21) Appl. No.: 12/448,629

(22) PCT Filed: Dec. 28, 2007

(86) PCT No.: PCT/JP2007/075313
§ 371 (c)(1),
(2), (4) Date: Jun. 26, 2009

(87) PCT Pub. No.: WO2008/081944
PCT Pub. Date: Jul. 10, 2008

(65) Prior Publication Data
US 2009/0297952 A1  Dec. 3, 2009

(30) Foreign Application Priority Data

Dec. 28, 2006  (JP) .................. 2006-354193

(51) Int. Cl.
*H01M 4/58* (2010.01)
*H01B 1/02* (2006.01)
(52) U.S. Cl.
USPC ............ 429/231.8; 429/209; 429/218.1; 429/231.95; 429/232; 252/521.2; 29/623.5
(58) Field of Classification Search
IPC ............. H01M 4/02,4/04, 4/136, 4/13, 4/5825, H01M 4/131, 4/139, 4/1393, 4/587, 4/625, H01M 2004/021, 10/05; C01B 31/02; C01P 2004/84; Y02E 60/122
See application file for complete search history.

(56) References Cited

U.S. PATENT DOCUMENTS 6,440,606 B1 *  8/2002  Yoshizawa et al. .......... 429/221
(Continued)

FOREIGN PATENT DOCUMENTS

EP     2 458 666 A1   5/2012
(Continued)

OTHER PUBLICATIONS

I. Belharouak et al., Synthesis and electrochemical analysis of vapor-deposited carbon-coated LiFePO$_4$, Electrochemistry Communications 7 (2005) 983-988; Elsevier May 18, 2005, Chemical Engineering Division, Argonne National Laboratory, 9700 South Cass Avenue, Argonne, IL 60439, USA—available online at www.sciencedirect.com.

(Continued)

*Primary Examiner* — Alix Echelmeyer
(74) *Attorney, Agent, or Firm* — Carrier Blackman & Associates, P.C.; Joseph P. Carrier; William D. Blackman

(57) ABSTRACT

Disclosed is a positive electrode material for nonaqueous electrolyte secondary batteries, which comprises a porous body composed of a material containing a polyanion. Also disclosed is a method for producing such a positive electrode material for nonaqueous electrolyte secondary batteries. When a carbon coating is formed on the surface of a material containing a polyanion of lithium iron phosphate or the like by a conventional method, the capacity during low rate discharge is improved but the capacity is not sufficient. In the present invention, the positive electrode material for nonaqueous electrolyte secondary batteries, which comprises a porous body composed of a material containing a polyanion, has a structure wherein the inner walls of the pores of the porous body are provided with a layered carbon, for improving the discharge capacity.

12 Claims, 4 Drawing Sheets

(56) References Cited

U.S. PATENT DOCUMENTS

| | | | |
|---|---|---|---|
| 7,285,260 | B2 | 10/2007 | Armand et al. |
| 7,457,018 | B2 | 11/2008 | Armand et al. |
| 2002/0028380 | A1* | 3/2002 | Tanjo et al. .................. 429/209 |
| 2002/0106564 | A1 | 8/2002 | Okawa et al. |
| 2004/0033360 | A1* | 2/2004 | Armand et al. ............... 428/408 |
| 2004/0157126 | A1 | 8/2004 | Belharouak et al. |
| 2004/0240144 | A1* | 12/2004 | Schott et al. .................. 361/302 |
| 2005/0064096 | A1 | 3/2005 | Kurihara et al. |
| 2006/0035150 | A1 | 2/2006 | Audemer et al. |
| 2006/0141361 | A1* | 6/2006 | Yuasa et al. ................... 429/232 |
| 2006/0222951 | A1* | 10/2006 | Tatsumi et al. ........... 429/231.95 |
| 2006/0257734 | A1* | 11/2006 | Obata et al. ................... 429/206 |
| 2007/0054187 | A1* | 3/2007 | Nuspl et al. ................. 429/218.1 |
| 2008/0081258 | A1* | 4/2008 | Kim et al. ..................... 429/209 |

FOREIGN PATENT DOCUMENTS

| | | |
|---|---|---|
| JP | 2001-015111 A | 1/2001 |
| JP | 2002-117833 A | 4/2002 |
| JP | 2003-034534 A | 2/2003 |
| JP | 2003-292308 A | 10/2003 |
| JP | 2004-014340 A | 1/2004 |
| JP | 2004-509058 | 3/2004 |
| JP | 2004-509447 | 3/2004 |
| JP | 2004-186075 A | 7/2004 |
| JP | 2005-116393 A | 4/2005 |
| JP | 2006-269350 A | 10/2006 |
| JP | 2006-278031 A | 10/2006 |
| WO | WO 0227823 A1 | 4/2002 |
| WO | WO 0227824 A1 | 4/2002 |
| WO | WO 2005/051840 * | 6/2005 |

OTHER PUBLICATIONS

Z. Chen et al., Reducing Carbon in $LiFePO_4$/ C Composite Electrodes to Maximize Specific Energy, Volumetric Energy, and Tap Density, Journal of the Electrochemical Society, 149 (9) A1184-A1189 (2002), Department of Physics and Department of Chemistry, Dalhousie University, Halifax, Nova Scotia B3H 3J5.

Tajimi S et al., "Enhanced Electrochemical Performance of LiFePO4 Prepared by Hydrothermal Reaction", Solid State Ionics, North Holland Pub. Company. Amsterdam; NL, NL, vol. 175, No. 1-4, Nov. 30, 2004, pp. 287-290, XP004667584.

R. Dominko et al., "Impact of the Carbon Coating Thickness on the Electrochemical Performance of LiFePO [sub 4] / C Composites", Journal of the Electrochemical Society, vol. 152, No. 3, Jan. 1, 2005, p. A607 XP55037510.

* cited by examiner

POSITIVE ELECTRODE MATERIAL FOR NONAQUEOUS ELECTROLYTE SECONDARY BATTERY, NONAQUEOUS ELECTROLYTE SECONDARY BATTERY INCLUDING THE SAME, AND METHOD FOR PRODUCING THE SAME

TECHNICAL FIELD

The invention relates to a positive electrode material for a nonaqueous electrolyte secondary battery, a nonaqueous electrolyte secondary battery including the same, and a method for producing the same.

BACKGROUND ART

In recent years, nonaqueous electrolyte secondary batteries having high energy density and excellent in cycle performance have been drawing attention as power sources for portable appliances such as mobile phones and notebook personal computers as well as for electric automobiles. Among such nonaqueous electrolyte secondary batteries, those which are presently most widely distributed in the market are compact batteries for consumer use represented by batteries of 2 Ah or less for mobile phones.

Today, there are a lot of materials as a positive electrode material for a nonaqueous electrolyte secondary battery and most commonly known are lithium-containing transition metal oxides mainly containing lithium cobalt oxide ($LiCoO_2$) and lithium nickel oxide ($LiNiO_2$) having an operating voltage around 4V as well as lithium manganese oxide ($LiMn_2O_4$) having a spinel structure. Especially, lithium cobalt oxide among them has been widely employed as a positive electrode material excellent in charge-discharge characteristics and energy density in a small capacity lithium secondary battery with a battery capacity up to 2 Ah.

However, in consideration of development of middle to large scale batteries for industrial use expected to be strongly demand in future, safety of batteries will be regarded as very important and the specifications of today's compact batteries can not satisfy the required safety. One of the reasons for this problem is that the thermal stability of the positive electrode material of the compact batteries is low.

Therefore, recently, a positive electrode material containing a polyanion with high thermal stability such as $LiFePO_4$ having an olivine structure has been drawing attention among lithium-containing composite oxides. This material does not release oxygen even at a high temperature and is thus suitable for remarkably improving the safety of batteries.

However, the positive electrode material containing a polyanion such as $LiFePO_4$ has low electric conductivity as compared with a lithium-containing transition metal oxide such as $LiCoO_2$ and therefore, if an electrode is produced in the same manner as in $LiCoO_2$, the battery to be obtained can not give sufficient high rate discharge characteristics.

To improve such a defect, Patent Documents 1 to 10 disclose techniques of forming carbon coatings on particle surfaces of polyanion materials such as $LiFePO_4$.

Japanese Patent Application Laid-Open (JP-A) No. 2001-015111 (Patent Document 1), a Japanese patent document, discloses a technique of obtaining lithium iron phosphate ($LiFePO_4$) coated with a carbonaceous deposit by finely pulverizing run steel ($Fe_3(PO_4)_2 \cdot 8H_2O$), lithium orthophosphate, and a polypropylene powder with a zirconia ball mill and thereafter heating the pulverized product at 350 to 700° C.

JP-A No. 2002-117833 (Patent Document 2), a Japanese patent document, discloses a technique of obtaining a $LiFePO_4$/carbon composite body by mixing $Li_3PO_4$ and $Fe_3(PO_4)_2 \cdot 8H_2O$, adding an acetylene black powder thereto to obtain a mixture, milling the mixture using a planet ball mill, and thereafter firing the mixture at 600° C.

JP-A No. 2003-034534 (Patent Document 3), a Japanese patent document, discloses a method for producing a carbon-containing lithium-iron composite oxide for a positive electrode material for a lithium secondary battery by mixing a lithium compound, an iron compound, a phosphorus-containing ammonium salt, and carbonaceous fine particles to obtain a mixture and firing the mixture at a temperature of 600 to 750° C., thereby making a composite of the carbonaceous fine particles with particles of the olivine structure lithium-iron composite oxide ($LiFePO_4$).

JP-A No. 2003-292308 (Patent Document 4), a Japanese patent document, discloses a method for producing a lithium-iron-phosphorus type composite oxide-carbon composite body obtained by coating the surface of $LiFePO_4$ particles with a conductive carbon material by mixing ferrous phosphate hydrated salt ($Fe_3(PO_4)_2 \cdot 8H_2O$), lithium phosphate ($Li_3PO_4$), and a conductive carbon material, dry-pulverizing the mixture to obtain a reaction precursor with a specific volume of 1.5 ml/g or less, firing the reaction precursor to coat the surfaces of the $LiFePO_4$ particles with the conductive carbon material, and pulverizing the particles.

JP-A No. 2004-186075 (Patent Document 5), a Japanese patent document, discloses a technique of coating the surface of a lithium iron oxide, which is a positive electrode material for a nonaqueous secondary battery, with carbon fibers.

Japanese Patent Application National Publication No. 2004-509058 (Patent Document 6), a Japanese patent document, and Japanese Patent Application National Publication No. 2004-509447 (Patent Document 7), a Japanese patent document, disclose methods for synthesizing positive electrode materials having cores of $LiMPO_4$ coated with carbon by mixing an element M source, a lithium compound, and a compound to be a P source and thermally decomposing a carbon source in the presence of a conductive carbon source containing a furfuryl alcohol polymer.

US20040157126A1 (Patent Document 8) discloses a method for synthesizing a positive electrode material having cores of $LiMPO_4$ coated with carbon by thermal decomposition of a gas mixture containing hydrocarbon as a carbon source.

Further, JP-A No. 2005-116393 (Patent Document 9), a Japanese patent document, discloses a method for making ultrafine particles of lithium iron phosphate as a means for improving the high rate discharge characteristics and discloses that it is easy to produce nano-particles with high purity and even composition as well as an average particle size of several 10 nm or smaller.

Furthermore, JP-A No. 2004-014340 (Patent Document 10), a Japanese patent document, discloses that the electron supply capability is improved by adding a substance having electric conductivity to the inside of a material such as a $LiFe_{1-x}M_xPO_4$-based material. This document further discloses that a plurality of primary particles of the electrode material are aggregated and these primary particles are bonded to a three-dimensional mesh-like electric conductive substance layer in a thin layer state and made to form secondary particles with a spherical or polygonal shape as a whole. Moreover, carbon is disclosed as a substance having the electric conductivity.

Patent Document 1: JP-A No. 2001-015111
Patent Document 2: JP-A No. 2002-117833

Patent Document 3: JP-A No. 2003-034534
Patent Document 4: JP-A No. 2003-292308
Patent Document 5: JP-A No. 2004-186075
Patent Document 6: Japanese Patent Application National Publication No. 2004-509058
Patent Document 7: Japanese Patent Application National Publication No. 2004-509447
Patent Document 8: US 20040157126A1
Patent Document 9: JP-A No. 2005-116393
Patent Document 10: JP-A No. 2004-014340

DISCLOSURE OF THE INVENTION

Problems to be Solved by the Invention

Even if a carbon coating is formed on the particle surface of a polyanion-containing material such as lithium iron phosphate by the methods disclosed in the above-mentioned conventional technical documents, the capacity is still insufficient although the capacity at the time of low rate discharge can be improved. The invention aims to improve the discharge capacity of a positive electrode material for a nonaqueous electrolyte secondary battery containing a polyanion-containing material.

Means for Solving the Problems

In an aspect of the invention, provided is a positive electrode material for a nonaqueous electrolyte secondary battery including a porous body of a polyanion-containing material, wherein inner walls of pores of the porous body are provided with carbon in layer state.

In another aspect of the invention, provided is a method for producing a positive electrode material for a nonaqueous electrolyte secondary battery including a porous body of a polyanion-containing material and carbon, wherein carbon is supplied to the polyanion-containing material in a manner that inner walls of pores of the porous body are provided with the carbon in layer state.

The porous body according to the invention may include those having voids remaining among primary particles, with respect to secondary particles formed by aggregating the primary particles.

Effects of the Invention

In the invention, since the inner walls of pores of the porous body are provided with carbon in layer state, sufficient electric conductivity is provided even to the inside of the porous body. Further, since an electrolyte solution can penetrate the inside of the porous body through the pores remaining without being clogged with the carbon layer, the surface area of the positive electrode active material particles to be brought into contact with the electrolyte solution can be kept wide and at the same time the contribution to the battery's internal resistance of the solid-phase internal diffusion resistance of lithium ions from the surfaces of the positive electrode active material particles to the inside of the particles can be decreased. As a result, a nonaqueous electrolyte secondary battery with a high capacity at the time of discharge can be provided.

BEST MODES FOR CARRYING OUT THE INVENTION

Figure 1:
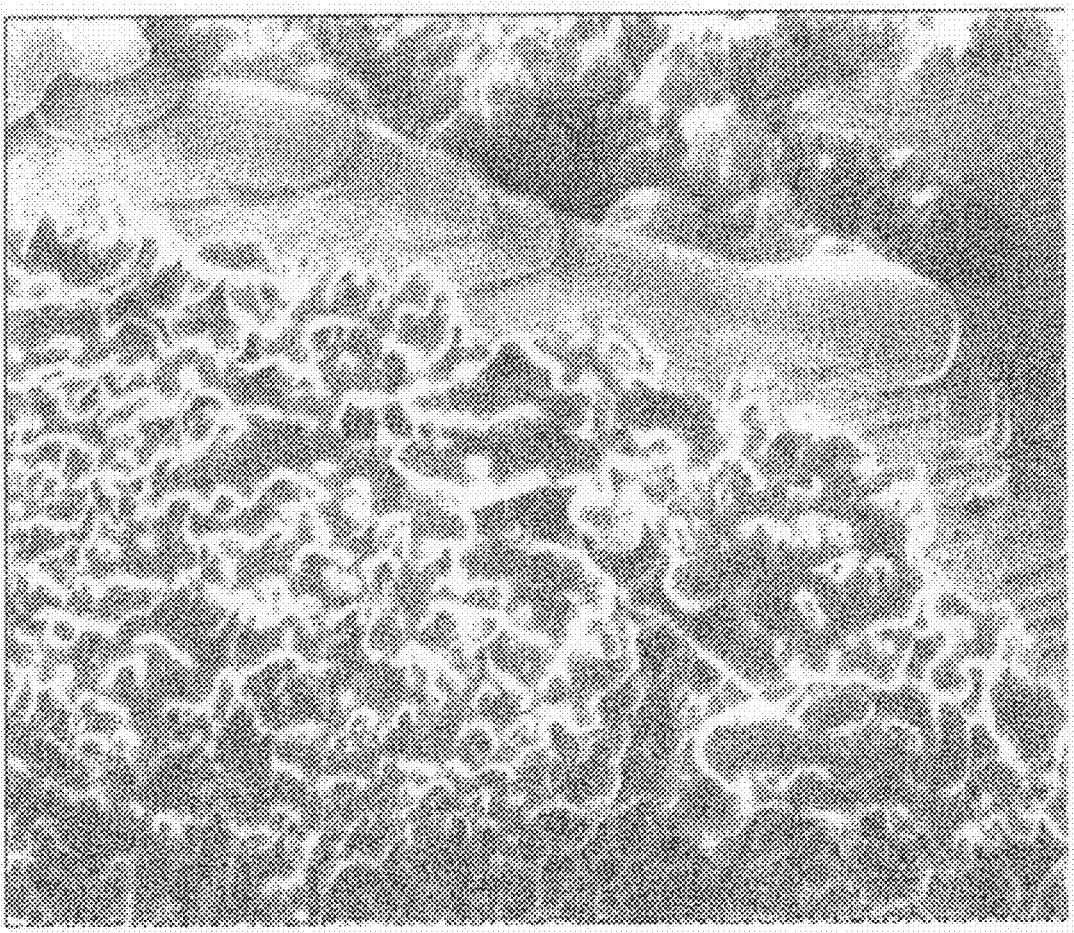
FIG. 1: A photograph of a cross section of the positive electrode material for a nonaqueous electrolyte secondary battery in Example 1.

The positive electrode material for a nonaqueous electrolyte secondary battery of the invention can be produced by providing carbon to inner walls of a porous body, which is made of a polyanion-containing material. Alternatively, it can also be produced by forming porous secondary particles by forming a carbon layer on surfaces of primary particles of a polyanion which are not so much aggregated and at the same time aggregating the primary particles.

Examples of the polyanion-containing material include those having general formulas: $Li_{1+x}MP_{1-x}Si_xO_4$, $Li_{1+x-y}MP_{1-x}Si_xO_{4-y}F_y$, $Li_{3-x+z}M_2(P_{1-x-z}S_xSi_zO_4)_3$ and $Li_{3+u-x+z}V_{2-z-w}Fe_uTi_w(P_{1-x-z}S_xSi_zO_4)_3$ (wherein w≤2, 0≤x, y≤1, z≤1, and M includes Fe, Co, Mn, or Ni).

As a raw material of carbon to be supplied to the polyanion-containing material, it is preferable to use thermal decomposition products of organic matters, gases containing CO and C, and CO gas precursors.

With respect to conventional techniques of bonding positive electrode materials in which nano-particles coated with carbon are not aggregated, the conductivity among the nano-particles is decreased because of contact resistance among carbon coatings. On the other hand, in the invention, in the case the inner walls of pores of a porous body are provided with carbon in layer state by using a gaseous carbon source, a structure in which the carbon layer forms continuous three-dimensional meshes is provided. Accordingly, even if primary particles compose secondary particles as a porous body, a plurality of primary particles are coated with a not-separated and united carbon layer. In other words, in the present invention the primary particles forming one of the secondary particles are not completely covered in carbon but the pores, formed when the primary particles are aggregated to have portions where the primary particles directly contact each other, become covered by the carbon in a state of three-dimensional meshes. That is, a plurality of primary particles are electrically connected in a state where there is no contact resistance in the carbon layer. As a result, in the case the carbon amounts to be supplied are almost the same, as compared with the conventional nano-particles, the contact resistance among primary particles of a polyanion material can be lowered in the invention.

With respect to the step of supplying carbon to a polyanion-containing material, it is preferable to employ an inert atmosphere or a reducing atmosphere in order to avoid elimination of carbon due to thermal decomposition in the case the temperature of the step of high. In particular, a reducing atmosphere containing a hydrogen gas is preferable.

It is preferable to select the carbon source among organic matters which emit a hydrogen gas, a reducing gas, together with C at the time of thermal decomposition. Especially, if alcohols are selected as the carbon source, it is preferable since they have various advantages, e.g., the raw material cost is low, a container for storing the raw materials can be simple as compared with the case of using hydrocarbon gases or the like, it is easy to supply necessary and sufficient carbon to the inner walls of the porous body made of a polyanion-containing material since the raw material gases can be sufficiently diffused to the inner walls of the porous body, and the like.

Although a higher alcohol (alcohol solid at 25° C.) may be used, in the case of using a lower alcohol, there is no need to keep the alcohol at the temperature equal to or higher than the melting point and in a liquid state unlike the case of using a higher alcohol, and therefore, it is preferable to use a lower alcohol.

Examples of the lower alcohol include methanol, ethanol, propanol, butanol, and ethylene glycol and particularly methanol and ethanol are preferable since they have an ignition point as low as 400° C. or lower and easily thermally decomposed.

A method for supplying a lower alcohol to a firing furnace may be a method of directly supplying an alcohol in liquid form, a method of supplying an alcohol after evaporating the alcohol, or the like. In the case an alcohol is supplied after being evaporated, it is preferable to supply an alcohol as a gas mixture by making the alcohol gaseous and mixing the alcohol with a gas such as nitrogen, argon, or helium and in this case, the concentration of the alcohol in the gas mixture is preferably in a range of 0.01 to 50%. The time taken for the step of forming the carbon layer on the inner walls of the pores of the porous body made of a polyanion-containing material can be shortened by controlling the alcohol concentration to be 0.01% or higher and therefore, it is preferable. Further, since reduction in the carbonization ratio of the alcohol and inefficient carbonization can be prevented because the alcohol remaining undecomposed is discharged outside by controlling the alcohol concentration to be 50% or lower, and therefore, it is preferable.

The procedure of supplying carbon to the inner walls of a porous body made of a polyanion-containing material using a carbon source may be a method of placing a polyanion-containing material in a firing furnace, thereafter heating the firing furnace to a high temperature, and supplying a carbon source; a method of placing a polyanion-containing material in a firing furnace and thereafter supplying a carbon source while heating the firing furnace to a high temperature, a method of dispersing a polyanion-containing material in a carbon source solution or a carbon source in liquid form and spraying the obtained dispersion to a furnace kept at a high temperature, or the like.

In the firing furnace at a high temperature, there is a possibility of a problem of decrease in the fine pore diameter of a porous body made of a polyanion-containing material or of clogging of the pores; however, selection of the method of placing a polyanion-containing material in a firing furnace and thereafter supplying an alcohol while heating the firing furnace to a high temperature among the above exemplified methods is preferable since the carbon layer can be formed on the inner walls of the porous body before the decrease in the fine pore diameter or the clogging of pores is caused and accordingly, the decrease in the utilization efficiency as a positive electrode active material because of the decrease in the fine pore diameter or the clogging of pores can be suppressed.

The temperature of the firing furnace is preferably at lowest a thermal decomposition and carbonization temperature of a carbon source and at highest a temperature at which the decrease in the fine pore diameter or the clogging of pores of a porous body made of a polyanion-containing material is suppressed. For example, in the case the carbon source is methanol or ethanol, since the ignition points of methanol and ethanol are 385° C. and 363° C., respectively, it is supposed that at least no thermal decomposition is caused at these temperatures or lower. Accordingly, in the case of using these carbon sources, the temperature of a firing furnace has to be the ignition point or higher. Further, in the case of using $LiFePO_4$ as a polyanion-containing material, the above-mentioned decrease in the fine pore diameter or clogging of pores can be avoided by controlling the temperature of a firing furnace to be 750° C. or lower, and therefore it is preferable.

A method of obtaining a porous body made of a polyanion-containing material is not particularly limited; however, for example, a method of preparing nano-particles of a polyanion material and sintering the particles of the polyanion material by thermal treatment to give a porous body may be employed. The average particle size of the nano-particles may be selected in a range of 1 nm or larger and smaller than 1000 nm. Herein, porous body particles may be formed by subjecting the nano-particles as they are to the sintering step and thereafter pulverizing the sintered bulky material and also by aggregating the nano-particles to be particles in several μm order or several mm order by a granulation step and then using the obtained particles for the sintering step. In this case, one secondary particle obtained by aggregation in the granulation step becomes a single porous body particle through the sintering step.

The method of obtaining the nano-particles made of a polyanion-containing material is preferably a hydrothermal method (e.g., S. Franger et al. Electrochem and Solid-State Letters, 5(10)A231-A233, 2002). If the nano-particles made of a polyanion-containing material are synthesized by employing a hydrothermal method, a polyanion material can be synthesized in a state that the primary particles are not so much aggregated. Alternatively, even if the primary particles are aggregated, the aggregates have a very high porosity as compared with the case of synthesis by firing. If the primary particles are aggregated by forming a carbon coating for the polyanion-containing material in which the primary particles are not so much aggregated or if a carbon coating is formed on the aggregates with high porosity by precipitation from a gas, a structure in which carbon is provided in layer state in the inner walls of the pores of the porous body tends to be formed. Accordingly, in the synthesis method of a positive electrode material for a nonaqueous electrolyte secondary battery of the invention, it is preferable to form a carbon coating for a positive electrode material synthesized by a hydrothermal method.

As the porous body in the invention, a porous body obtained by aggregating the primary particles to secondary particles and leaving voids among primary particles is preferable. In conventional techniques of bonding the primary particles of a positive electrode material which are nano-particles coated with carbon and not aggregated with a binder, there is a problem that a large quantity of the binder is required for the bonding of the particles. In the invention, in the case of using a porous positive electrode material in which primary particles are aggregated to form secondary particles, a binder for primary particles is not required. Accordingly, the amount of the binder can be reduced as compared with that of the conventional techniques of bonding the primary particles of a positive electrode material, which are nano-particles coated with carbon and not aggregated, with a binder.

As disclosed in JP-A No. 2005-325232, the granulation method may be stirring and mixing granulation, rotating granulation, extruding granulation, crushing granulation, fluidized-bed granulation, spray-drying granulation, fusion granulation, compacting granulation, vacuum freezing granulation, suspension flocculation granulation, coating granulation, or the like. Especially, if a spray-drying granulation method is employed, porous particles having pores appropriate for the invention can be obtained after sintering and therefore, it is preferable. That is, the pore diameter in the periphery of the center of the porous particles is made different in the size and shape from that in the periphery of the surface of the particles and accordingly, it is made possible to obtain a positive electrode active material capable of giving a nonaqueous electrolyte secondary battery excellent in the property of retaining the electrolyte solution in the pores, low temperature properties, and outputting properties. In the spray-drying granulation, the drying is preferably carried out in an inert atmosphere.

In the case of employing a production method by bonding (sintering) particles of a polyanion material by heat treatment of the polyanion material of nano-particles, the "step of obtaining a porous body of a polyanion-containing material by sintering particles of a polyanion material by heat treatment of the polyanion material of nano-particles" and the "step of supplying carbon to the porous body made of the polyanion-containing material" may be simultaneously carried out as a single step and accordingly, decrease in the fine pore diameter and clogging of the pores can be effectively suppressed. That is, it is possible to suppress promotion of aggregation of particles supposed to occur in the step of sintering particles of a polyanion material by heat treatment of the polyanion material of nano-particles.

The mass ratio of carbon to be supplied to a polyanion-containing material is preferably 0.01 to 30 mass %. Since the amount of carbon to be supplied can be made sufficient by adjusting the mass ratio of carbon to be 0.01 mass % or higher, the effect of improving the electric conductivity of a positive electrode active material can be sufficiently caused and therefore, it is preferable. On the other hand, the time taken to the step of supplying carbon can be shortened and decrease in the energy density as a positive electrode active material due to excess carbon can be suppressed by adjusting the mass ratio of carbon to be 30 mass % or lower and therefore, it is preferable.

Next, an embodiment of a nonaqueous electrolyte secondary battery of the invention will be described. The nonaqueous electrolyte secondary battery of the invention includes a positive electrode containing the above-mentioned positive electrode material, a negative electrode containing a negative electrode material, and a nonaqueous electrolyte containing an electrolytic salt in a nonaqueous solvent and in general, a separator is sandwiched between the positive electrode and the negative electrode and layered or rolled to give an electrode group and an outer casing wrapping this electrode group is installed.

As the nonaqueous electrolyte, generally, those proposed as being usable for nonaqueous electrolyte secondary batteries are usable. Examples of the nonaqueous solvent include cyclic carbonic acid esters such as propylene carbonate, ethylene carbonate, butylene carbonate, and chloroethylene carbonate; cyclic esters such as γ-butyrolactone and γ-valerolactone; chain carbonates such as dimethyl carbonate, diethyl carbonate, and ethyl methyl carbonate; chain esters such as methyl formate, methyl acetate, and methyl butyrate; tetrahydrofuran and its derivatives; ethers such as 1,3-dioxane, 1,4-dioxane, 1,2-dimethoxyethane, 1,4-dibutoxyethane, and methyl diglyme; nitriles such as acetonitrile and benzonitrile; dioxolan and its derivatives; ethylene sulfide, sulfolane, sulfone and their derivatives and they may be used alone or two or more of them may be used in form of a mixture without limitation.

Examples of the electrolytic salt include ionic compounds such as $LiClO_4$, $LiBF_4$, $LiAsF_6$, $LiPF_6$, $LiCF_3SO_3$, $LiN(SO_2CF_3)_2$, $LiN(SO_2C_2F_5)_2$, $LiN(SO_2CF_3)(SO_2C_4F_9)$, LiSCN, LiBr, LiI, $Li_2SO_4$, $Li_2B_{10}Cl_{10}$, $NaClO_4$, NaI, NaSCN, NaBr, $KClO_4$, and KSCN and these ionic compounds may be used alone or two or more of them may be used in the form of a mixture. Among these ionic compounds, $LiN(SO_2C_2F_5)_2$ is excellent in high temperature stability and capable of suppressing corrosion of an aluminum current collector and terminals at the time of charging and therefore, it is preferable.

The concentration of the electrolytic salt in the nonaqueous electrolyte is preferably 0.5 mol/l to 5 mol/l and more preferably 1 mol/l to 2.5 mol/l to reliably obtain a nonaqueous electrolyte battery excellent in the battery properties.

Examples of the negative electrode material include a lithium metal, lithium alloys (lithium metal-containing alloys such as lithium-aluminum, lithium-lead, lithium-tin, lithium-aluminum-tin, lithium-gallium, and Wood's metal), as well as alloys capable of absorbing and desorbing lithium, carbon materials (e.g., graphite, hard carbon, low temperature baked carbon, and amorphous carbon), metal oxides, lithium metal oxides (such as $Li_4Ti_5O_{12}$), and polyphosphoric acid compounds.

Among them, graphite has a high operating potential extremely close to that of lithium metal and is capable of performing charge and discharge at a high operating voltage and therefore, it is preferable as the negative electrode material. For example, artificial graphite and natural graphite are preferable. Particularly, graphite obtained by modifying the surfaces of negative electrode material particles with amorphous carbon or the like is preferable since gas emission during charging is slight.

Further, in the case a lithium salt is used as an electrolytic salt, $Li_4Ti_5O_{12}$ is capable of suppressing self discharge and also suppressing irreversible capacity in charge and discharge and therefore, it is preferable as a negative electrode material.

A powder of a positive electrode material and a powder of a negative electrode material are preferable to have an average particle size of 100 μm or smaller. Particularly, the powder of a positive electrode material is preferable to have an average particle size of 50 μm or smaller in terms of the electric conductivity. To obtain a powder in the prescribed shape, a pulverizer or a classifier may be used.

For example, a mortar, a ball mill, a sand mill, a vibration ball mill, a planet ball mill, a bead mill, a jet mill, a counter jet mill, a swirling airflow type jet mill, and a sieve may be used. At the time of pulverization, wet pulverization in coexistence of water, NMP, or an organic solvent such as ethanol is suitably employed. A classification method is not particularly limited and a sieve or a blowing classifier may be employed for both dry and wet methods as necessary.

The positive electrode material and the negative electrode material, which are main constituent components of the positive electrode and the negative electrode are described above in detail, the positive electrode and the negative electrode may further contain a conductive agent, a binder, a thickener, a filler, and the like as other constituent components besides the main constituent components.

Examples of the conductive agent are not particularly limited as long as they are electric conductive materials without causing any adverse effect on the battery performance and generally it is proper to add one conductive material or mixtures of conductive materials such as natural graphite (scaly graphite, flaky graphite, soil-like graphite and the like), artificial graphite, carbon black, acetylene black, Ketjen black, carbon whiskers, carbon fibers, metal (copper, nickel, aluminum, silver, gold and the like) powders, metal fibers, conductive ceramic materials, and the like. Among them, acetylene black is preferable as the conductive agent in terms of electric conductivity and coatability.

The addition amount of the conductive agent is preferably 0.1 mass % to 50 mass % to the total mass of the positive electrode or the negative electrode and particularly preferably 0.5 mass % to 30 mass %. Particularly, if acetylene black is used after being pulverized to ultrafine particles of 0.1 to 0.5 μm, the needed carbon amount can be reduced and therefore, it is preferable.

A mixing method for them is a physical mixing and ideally uniform mixing. Therefore, a powder mixing apparatus such as a V-type mixer, a S-type mixer, an agitator, a ball mill, a planet ball mill, or the like may be employed for dry or wet mixing.

To employ the positive electrode active material of the invention having the porous body containing carbon in the inner walls of the pores to electrodes of a battery, carbon or the like with a different form from the carbon supplied to the inner walls of the pores can be added as the conductive agent to the outermost face of the porous particles. The form of the carbon may be fibrous, snake-like, spherical, nanotube-like, nanohorn-like, nano-coil-like, nano-wall-like or scaly.

As the binder, it is proper to use one or mixtures of two or more of thermoplastic resins such as polytetrafluoroethylene (PTFE), polyvinylidene fluoride (PVDF), polyethylene, and polypropylene; and polymers having rubber elasticity such as ethylene-propylene-diene terpolymers (EPDM), sulfonated EPDM, styrene-butadiene rubber (SBR), and fluororubber. The addition amount of the binder is preferably 1 to 50% and particularly preferably 2 to 30% to the total mass of the positive electrode or the negative electrode.

With respect to the amount of the binder, a smaller amount is suitable for energy density, utilization factor, and the high rate discharge characteristics but on the other hand, the formability and binding property of the electrodes are lowered. Accordingly, in terms of the cycle performance or storage characteristics, a certain amount or more of a binder is required.

As the thickener, generally, it is proper to use one or mixtures of two or more of polysaccharides such as carboxymethyl cellulose and methyl cellulose. Further, a thickener having a functional group reactive on lithium similarly to polysaccharides is preferable to be methylated to deactivate the functional group. The addition amount of the thickener is preferably 0.5 to 10 mass % and particularly preferably 1 to 2 mass % to the total mass of the positive electrode or the negative electrode.

As the filler, any materials may be used unless they cause any adverse effect on the battery performance. In general, olefin type polymers such as polypropylene and polyethylene, amorphous silica, alumina, zeolite, glass, and carbon may be used. The addition amount of the filler is preferably 30 mass % or less to the total mass of the positive electrode or the negative electrode.

The positive electrode and the negative electrode are produced properly by mixing the above-mentioned materials, the conductive agent, and the binder in an organic solvent such as N-methylpyrrolidone, toluene, or the like and applying the obtained mixed solution to current collectors described later in detail and drying the solution.

With respect to an application method, it is preferable to apply the solution in an arbitrary thickness and an arbitrary shape using means such as roller coating, e.g., applicator rolls; screen coating, a doctor blade method, spin coating, and a bar coater; however, the application method is not limited to these examples.

Current collectors may be any material as long as they are electric conductors which do not cause any adverse effect on a constituted battery and the following materials are suitable. These materials may be subjected to surface oxidation treatment.

As a current collector for a positive electrode, preferable are aluminum, titanium, stainless steel, nickel, baked carbon, conductive polymers, and conductive glass and also materials obtained by treating surfaces of aluminum or copper with carbon, nickel, titanium, or silver to improve the adhesiveness, conductivity, and oxidation resistance.

As a current collector for a negative electrode, preferable are copper, nickel, iron, stainless steel, titanium, aluminum, baked carbon, conductive polymers, conductive glass, and an Al—Cd alloy, and also materials obtained by treating surfaces of copper with carbon, nickel, titanium, or silver to improve the adhesiveness, conductivity, and reduction resistance.

With respect to the form of the current collectors, a foil-like form as well as film-like, sheet-like, net-like forms, current collectors formed by punching or expanding, lath bodies, porous bodies, foamed bodies, and formed bodies of fiber groups may be employed. The thickness is not particularly limited; however, those with a thickness of 1 to 500 μm may be employed.

Among these current collectors, as the positive electrode, preferable is an aluminum foil excellent in oxidation resistance and as the negative electrode, preferable are a copper foil, a nickel foil, an iron foil, and alloy foils partially containing the above foils which are excellent in reduction resistance and conductivity and less expensive.

Further, foils with a coarse surface roughness of 0.2 μm Ra or higher are preferable and consequently, the adhesiveness of current collectors to the positive electrode material or the negative electrode material becomes excellent. Accordingly, electrolytic foils are preferable to be used since they have such a coarse surface. Particularly, electrolytic foils treated by nosing treatment are most preferable. In the case where both faces of the foils are coated, the surface roughness values of the foils are desired to be the same or approximately the same.

As the separator for a nonaqueous electrolyte battery, porous films and nonwoven fabrics showing excellent rate properties are preferably used alone or in combination. Examples of materials composing the separator for a nonaqueous electrolyte battery include polyolefin type resins represented by polyethylene and polypropylene; polyester type resins represented by poly(ethylene terephthalate) and poly(butylene terephthalate); poly(vinylidene fluoride), vinylidene fluoride-hexafluoropropylene copolymers, vinylidene fluoride-perfluorovinyl ether copolymers, vinylidene fluoride-tetrafluoroethylene copolymers, vinylidene fluoride-trifluoroethylene copolymers, vinylidene fluoride-fluoroethylene copolymers, vinylidene fluoride-hexafluoroacetone copolymers, vinylidene fluoride-ethylene copolymers, vinylidene fluoride-propylene copolymers, vinylidene fluoride-trifluoropropylene copolymers, vinylidene fluoride-tetrafluoroethylene-hexafluoropropylene copolymers, and vinylidene fluoride-ethylene-tetrafluoroethylene copolymers.

In terms of the strength, the porosity of the separator for a nonaqueous electrolyte battery is preferably 98% by volume or less. Further, in terms of the charge/discharge characteristics, the porosity is preferably 20% by volume or higher. Further, the separator for a nonaqueous electrolyte battery may be a polymer gel composed of polymers such as acrylonitrile, ethylene oxide, propylene oxide, methyl methacrylate, vinyl acetate, vinylpyrrolidone, or poly(vinylidene fluoride) and an electrolyte.

Furthermore, with respect to the separator for a nonaqueous electrolyte battery, it is preferable to use the above-mentioned porous films and nonwoven fabrics in combination with the polymer gel since the liquid retaining property for the electrolyte is improved. That is, the surface and wall faces of fine pores of a microporous polyethylene film are coated with a solvent-philic polymer in a thickness of several μm or thinner to give a film and the electrolyte is held in the fine pores of the film, so that the solvent-philic polymer is gelled.

Examples of the solvent-philic polymer include poly(vinylidene fluoride) as well as crosslinked polymers of acrylate monomers having an ethylene oxide group or an ester group, epoxy monomers, and monomers having an isocyanato group. The monomers can cause crosslinking reaction by using heating or ultraviolet rays (UV) in combination with radical initiators or active light beams such as electron beams (EB).

The solvent-philic polymers are preferable to be used in the form of a mixture with a physical property adjustment agent to an extent that the agent does not inhibit formation of crosslinked bodies in order to control the strength and physical properties. Examples of the physical property adjustment agent include inorganic fillers (metal oxides such as silicon oxide, titanium oxide, aluminum oxide, magnesium oxide, zirconium oxide, zinc oxide, and iron oxide; and metal carbonates such as calcium carbonate and magnesium carbonate), polymers (poly(vinylidene fluoride), vinylidene fluoride/hexafluoropropylene copolymers, polyacrylonitrile, poly(methyl methacrylate), and the like). The addition amount of the physical property adjustment agent is generally 50 mass % or less and preferably 20 mass % or less to the crosslinking monomers.

The nonaqueous electrolyte battery of the invention is produced preferably by injecting an electrolyte before or after laminating the separator for a nonaqueous electrolyte battery with the positive electrode and the negative electrode and finally sealing them with an outer wrapping material. In a nonaqueous electrolyte battery including a power generating element obtained by layering the positive electrode and the negative electrode sandwiching the separator for a nonaqueous electrolyte battery and rolling the layered body, the electrolyte is preferable to be injected before or after rolling the power generating element. As an injection method, it may be possible to inject the electrolyte at normal pressure and a vacuum impregnation method and a pressurizing impregnation method may also be employed.

Examples usable as a material for the outer casing of a lithium secondary battery include nickel-plated iron and stainless steel, aluminum, and metal-resin composite films. The configuration of a lithium secondary battery is not particularly limited and examples thereof include coin type batteries and button type batteries each having a positive electrode, a negative electrode, and a monolayer or multilayer separator; cylindrical batteries each having a positive electrode, a negative electrode, and a roll type separator; square batteries, and flat batteries.

The pore diameter distribution of materials can be measured by a mercury pressure penetration method or a gas adsorption method. The form of the carbon layer is supposed to differ depending on the pore diameter and the pore diameter distribution of materials. The cross section observation by a focused ion beam (FIB) processing observation apparatus is useful as an evaluation means for porous materials.

EXAMPLES

Hereinafter, the invention will be described more in detail with reference to examples.

Example 1

After a powder of $LiFePO_4$ with an average particle size of 200 nm was put in a tubular firing furnace, while the firing furnace was heated to 600° C. at a heating speed of 20° C./min, a nitrogen gas containing 1% by volume of evaporated methanol was supplied to produce lithium iron phosphate A ($LiFePO_4/C$) according to the invention. Herein, the content of methanol in the nitrogen gas was determined to adjust the thermally decomposed carbon supply amount to the $LiFePO_4$ to be 5 mass % by a preliminary experiment. The amount of carbon supplied to $LiFePO_4$ was obtained by thermogravimetric (TG) analysis for the lithium iron phosphate A ($LiFePO_4/C$) to 700° C. in the air.

(Production of Positive Electrode Plate)

The lithium iron phosphate A ($LiFePO_4/C$), acetylene black as a conductive agent, and poly(vinylidene fluoride) (PVdF) as a binder were mixed at a mass ratio of 80:8:12 and mixed with N-methyl-2-pyrrolidone (NMP) and sufficiently kneaded to produce a positive electrode paste. The positive electrode paste was applied to both faces of an aluminum foil current collector with a thickness of 20 μm and dried and thereafter, pressing process was carried out to obtain a positive electrode plate. A positive electrode terminal was welded to the positive electrode plate by resistance welding.

(Production of Negative Electrode Plate)

Artificial graphite (average particle size 6 μm, interplanar distance (d002) by x-ray diffractometry 0.337 nm, crystal size (Lc) in c-axis direction 55 nm) as a negative electrode material and PVdF as a binder were mixed at a mass ratio of 94:6 and mixed with NMP and sufficiently kneaded to produce a negative electrode paste. The negative electrode paste was applied to both faces of a copper foil current collector with a thickness of 15 μm and dried and thereafter, pressing process was carried out to obtain a negative electrode plate. A negative electrode terminal was welded to the negative electrode plate by resistance welding.

(Preparation of Electrolyte Solution)

$LiPF_6$ was dissolved at a concentration of 1 mol/l in a solvent obtained by mixing ethylene carbonate and diethyl carbonate at a volume ratio of 1:1 to produce a nonaqueous electrolyte. The water content in the electrolyte was suppressed to less than 30 ppm.

(Production of Battery)

Using the above-mentioned members, a thin type battery was produced in a dry atmosphere with a dew point of −40° C. or lower. The positive electrode plate and the negative electrode plate were rolled sandwiching a polypropylene separator with a thickness of 20 μm to give a power generating element. As an outer casing, a metal-resin composite film of poly(ethylene terephthalate) (15 μm)/aluminum foil (50 μm)/metal-adhesive polypropylene film (50 μm) was used and the power generating element was air-tightly sealed excluding a part to be an injection hole in a manner that the open end parts of the positive electrode terminal and the negative electrode terminal were exposed outside. After a prescribed constant amount of a nonaqueous electrolyte was injected through the injection hole and the injection hole part was thermally sealed in a vacuum state to produce a nonaqueous electrolyte secondary battery A of Example 1 of the invention. The size of the obtained nonaqueous electrolyte secondary battery A was 49.3 mm×33.7 mm×5.17 mm and the planned capacity was 500 mAh. The capacity was calculated assuming that the electric quantity per 1 g of LiFePO$_4$ was 160 mAh.

Comparative Example 1

A LiFePO$_4$/C powder with an average particle size of 200 nm and acetylene black were evenly mixed at a mass ratio of 95:5 to produce lithium iron phosphate B (LiFePO$_4$/C). The above-mentioned lithium iron phosphate B (LiFePO$_4$/C), acetylene black as a conductive agent, and poly(vinylidene fluoride) (PVdF) as a binder were mixed at a mass ratio of 80:8:12 and mixed with N-methyl-2-pyrrolidone (NMP) and sufficiently kneaded to produce a positive electrode paste. The positive electrode paste was applied to both faces of an aluminum foil current collector with a thickness of 20 μm and dried and thereafter, pressing process was carried out to obtain a positive electrode plate. A positive electrode terminal was welded to the positive electrode plate by resistance welding. A nonaqueous electrolyte secondary battery B of Comparative Example 1 was produced in the same manner as in Example 1, except that this positive electrode plate was used.

Comparative Example 2

A LiFePO$_4$/C powder with an average particle size of 200 nm and acetylene black were evenly mixed at a mass ratio of 50:50 to produce lithium iron phosphate C (LiFePO$_4$/C).

The lithium iron phosphate C (LiFePO$_4$/C) produced in the above-mentioned manner, acetylene black as a conductive agent, and poly(vinylidene fluoride) (PVdF) as a binder were mixed at a mass ratio of 70:8:22 and mixed with N-methyl-2-pyrrolidone (NMP) and sufficiently kneaded to produce a positive electrode paste. The positive electrode paste was applied to both faces of an aluminum foil current collector with a thickness of 20 μm and dried and thereafter, pressing process was carried out to obtain a positive electrode plate. A positive electrode terminal was welded to the positive electrode plate by resistance welding.

A nonaqueous electrolyte secondary battery C of Comparative Example 2 was produced in the same manner as in Example 1, except that this positive electrode plate was used.

Reference Example

The lithium iron phosphate C (LiFePO$_4$/C), acetylene black as a conductive agent, and poly(vinylidene fluoride) (PVdF) as a binder were evenly mixed at a mass ratio of 80:8:12, which is the same as that in Example 1, and production was tried; however, the mixture containing LiFePO$_4$/C was separated from the current collector at the time of pressing process to fail to produce a positive electrode plate.

Comparative Example 3

Lithium iron phosphate D (LiFePO$_4$/C) was produced in the same manner as in Example 1, except that LiFePO$_4$ with an average particle size of 5 μm was used. Further, a nonaqueous electrolyte secondary battery D of Comparative Example 3 was produced in the same manner as in Example 1, except that this lithium iron phosphate was used.

Comparative Example 4

As a blank experiment, lithium iron phosphate E (LiFePO$_4$) was produced by setting a LiFePO$_4$ powder with an average particle size of 200 nm in a firing furnace and thereafter heating the firing furnace to 600° C. and keeping the temperature. The retention time was set to be the same as the time for supplying the gas mixture (containing 1 vol % of methanol) of methanol and nitrogen in Example 1 so as to adjust the mass of carbon produced by thermal decomposition of methanol to be 5 mass % of LiFePO$_4$. Further, a nonaqueous electrolyte secondary battery E of Comparative Example 4 was produced in the same manner as in Example 1, except that this lithium iron phosphate was used.

[Test for Battery Performance]

First, the discharge capacities of the nonaqueous electrolyte secondary batteries A to E were investigated. The investigation was carried out by measuring the capacity obtained in the case where charging was carried out to 3.7 V at a constant electric current of 0.1 ItmA (10 hour rate, 50 mA) and at a constant voltage of 3.7 V for 15 hours in total and then, discharging was carried out to 2.0 V at a constant electric current of 0.1 ItmA (10 hour rate, 50 mA).

The results are shown in Table 1.

TABLE 1

| Type of battery | Discharge capacity |
| --- | --- |
| Nonaqueous electrolyte battery A | 495 mAh |
| Nonaqueous electrolyte battery B | 205 mAh |
| Nonaqueous electrolyte battery C | 491 mAh |
| Nonaqueous electrolyte battery D | 420 mAh |
| Nonaqueous electrolyte battery E | 205 mAh |

From Table 1, it can be understood that the discharge capacities of the nonaqueous electrolyte secondary battery A and the nonaqueous electrolyte C were higher than those of the nonaqueous electrolyte batteries B, D, and E.

Figure 2:
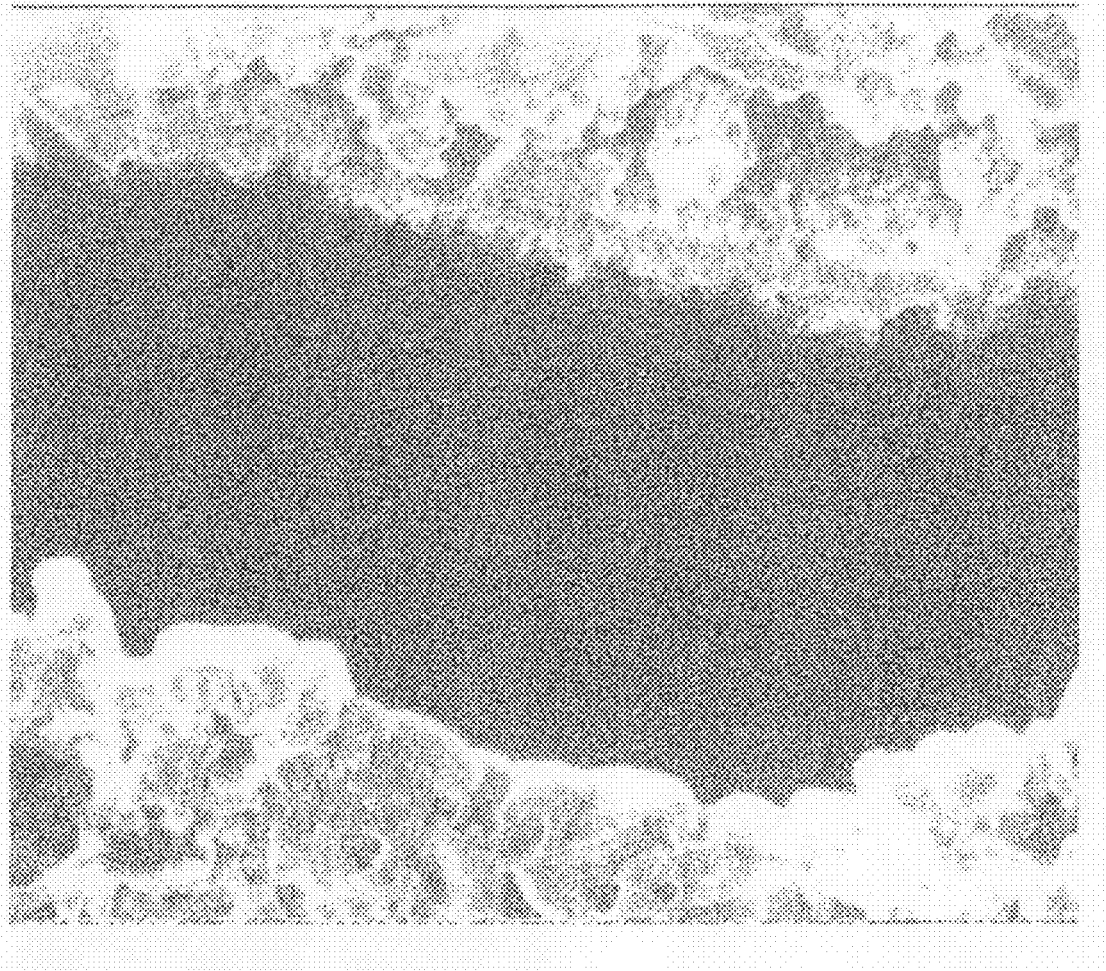
FIG. 2: A photograph of a cross section of the positive electrode material for a nonaqueous electrolyte secondary battery in Comparative Example 1.

To investigate the cause for this result, the cross section of the lithium iron phosphate A used for the nonaqueous electrolyte secondary battery A according to the invention having high capacity and the cross section of the lithium iron phosphate B used for the nonaqueous electrolyte secondary battery B having low capacity were observed using a focused ion beam processing observation apparatus (FIB). In FIB, a gallium ion beam was irradiated to a single secondary particle and the cross section of the secondary particle was exposed. Thereafter, a gallium ion beam was again irradiated to the cross section to photograph the cross section state using generated secondary electrons or ions. That is, FIG. 1 and FIG. 2 are photographs of a part of a cross section of each single secondary particle and FIG. 1 shows the result of observation of the lithium iron phosphate A and FIG. 2 shows the result of observation of the lithium iron phosphate B. FIG. 1 and FIG. 2 are both photographs with a transverse width equivalent to 6.08 μm and a vertical height equivalent to 7.42 μm The lower half of FIG. 1 shows the cross section of the lithium iron phosphate A and the center part of FIG. 2 shows the cross section of the lithium iron phosphate B. Further, due to characteristics of FIB, the parts of the outermost face of the observed porous bodies connected sufficiently in the electric conductivity were seen bright. That is, the parts have the carbon layer of the invention.

From FIG. 1, it can be understood that the inner walls of the pores of the lithium iron phosphate A of the invention was provided with the carbon layer. The carbon layer was intensively distributed in the surface of the LiFePO$_4$ nano-particles. That is, it can be found that carbon scarcely existed in the parts of the pores remote from the surface of the LiFePO$_4$ nano-particles and that such parts form large voids. "The carbon is provided in layer state in the inner walls of the pores of the porous body" in this specification means that the carbon layer is intensively distributed in the inner walls of the pores and thus those containing carbon distributed in the entire pores are excluded. Accordingly, the description of JP-A No. 2004-014340 (Patent Document 10) which discloses an electric conductive substance in a three-dimensional mesh like state is arranged in the entire pores is not included in the scope of the present invention.

The fact that the carbon layer is formed in the above-mentioned manner is supposedly attributed to that carbon is supplied simultaneously with aggregation of the nano-particles by supplying a methanol gas while heat treatment of the $LiFePO_4$ nano-particles is carried out at 600° C. Further, since the bright images showing the existence of carbon are finely spread in the whole plane, it is implied that the carbon is continuous in $LiFePO_4$ without vacancy. As a result, the utilization factor of the $LiFePO_4$ is supposed to be high and thus a large capacity can be obtained.

On the other hand, as being understood from FIG. 2, carbon in such a state was not observed in the lithium iron phosphate B. It is supposedly attributed to that carbon and $LiFePO_4$ were mixed merely mechanically using a ball mill and therefore, the small amount of carbon was maldistributed without being sufficiently diffused. As a result, it is supposed that the utilization factor of the $LiFePO_4$ was low and only a small capacity was obtained.

Further, the reason that the discharge capacity of the non-aqueous electrolyte C was high although carbon was merely mechanically mixed with $LiFePO_4$ by a ball mill is supposedly attributed to that since mixing was carried out using a large quantity of carbon, the ratio of carbon existing in the surface of the $LiFePO_4$ particles increased. However, in that case, the contact resistance among particles is increased as compared with that of the positive electrode material of the invention and as a result, it is supposed that the high rate discharge characteristics are deteriorated. Further, since the fine particles of $LiFePO_4$ exist as they are, a large quantity of a binder for binding the particles is supposed to be necessary. Accordingly, the reason for the failure to produce the electrode plate in the nonaqueous electrolyte secondary battery C even at the binder rate same as that of Example 1 is supposedly attributed to that a large quantity of a binder was required to bond the particles of $LiFePO_4$ and consequently the binder for bonding the current collector and the $LiFePO_4$ mixture became insufficient.

Further, the reason for the small discharge capacity of the nonaqueous electrolyte D is supposedly attributed that since the particles were not porous as compared with the lithium iron phosphate A of the invention, carbon was supplied only to the surface layer of the coarse particles and as a result, the electric conductive paths between the inside of the $LiFePO_4$ and the carbon layer became long and the resistance was thus increased.

Furthermore, the reason for the small discharge capacity of the nonaqueous electrolyte E is supposedly attributed that since carbon was mechanically mixed using a ball mill after heat treatment, the lithium iron phosphate was aggregated by the heat treatment and as a result, carbon was not supplied to the inner walls of the pores. Accordingly, it is supposed that carbon was not sufficiently diffused and the utilization factor was low and only a small capacity was obtained.

Further, also in the case of a material obtained by evenly coating nano-particles of $LiFePO_4$ with carbon and heating the obtained $LiFePO_4$ material, since carbon covers the $LiFePO_4$, aggregation of the particles by heat treatment is not supposed to occur and thus it could be impossible to obtain a porous body as in the invention.

Example 2

A $LiFePO_4$ powder synthesized by a hydrothermal method and containing primary particles in scarcely aggregated state and having an average particle size of the primary particles of 200 nm was put in a tubular firing furnace. Thereafter, while the firing furnace was heated to 600° C. at a heating speed of 20° C./min, a nitrogen gas containing evaporated methanol was supplied to produce lithium iron phosphate F ($LiFePO_4$/C) according to the invention. The gas supply was carried out by supplying a methanol gas-containing nitrogen gas obtained by bubbling a nitrogen gas in liquid methanol sealed in a container. The temperature of the container was set to be 45° C. Herein, the content of methanol in the nitrogen gas was determined so as to adjust the supply amount of thermally decomposed carbon to $LiFePO_4$ to be 5 mass % according to a preliminary experiment. The amount of carbon supplied to $LiFePO_4$ was obtained by thermogravimetric (TG) analysis for the lithium iron phosphate F ($LiFePO_4$/C) to 700° C. in the air.

(Production of Positive Electrode Plate)

The lithium iron phosphate F ($LiFePO_4$/C), acetylene black as a conductive agent, and poly(vinylidene fluoride) (PVdF) as a binder were mixed at a mass ratio of 80:8:12 and mixed with N-methyl-2-pyrrolidone (NMP) and sufficiently kneaded to produce a positive electrode paste. The positive electrode paste was applied to an aluminum foil current collector with a thickness of 20 µm and dried and thereafter, pressing process was carried out to obtain a positive electrode plate. A positive electrode terminal was welded to the positive electrode plate by resistance welding.

(Production of Negative Electrode Plate)

A Li foil with a thickness of 100 µm was press-bonded to a nickel foil to obtain a negative electrode plate. A negative electrode terminal was welded to the negative electrode plate by resistance welding.

(Preparation of Electrolyte Solution)

$LiPF_6$ was dissolved at a concentration of 1 mol/l in a solvent obtained by mixing ethylene carbonate and diethyl carbonate at a volume ratio of 1:1 to produce a nonaqueous electrolyte. The water content in the electrolyte was suppressed to less than 30 ppm.

(Production of Battery)

Using the above-mentioned members, a battery was produced in a dry atmosphere with a dew point of −40° C. or lower. First, the positive electrode plate and the negative electrode plate were set opposite to each other sandwiching a polypropylene separator with a thickness of 20 µm. Next, these members were put in a case made of a metal-resin laminate film and thereafter, the above-mentioned electrolyte solution was injected and the case was closely sealed with heat to obtain a nonaqueous electrolyte battery F of Example 2.

Comparative Example 5

A powder of $LiFePO_4$ synthesized by a hydrothermal method, containing primary particles not so much aggregated, and having an average particle size of the primary particles of 200 nm and acetylene black were evenly mixed at a mass ratio of 95:5 to produce lithium iron phosphate G ($LiFePO_4$/C). The lithium iron phosphate G ($LiFePO_4$/C), acetylene black as a conductive agent, and poly(vinylidene fluoride) (PVdF) as a binder were mixed at a mass ratio of 80:8:12 and mixed with N-methyl-2-pyrrolidone (NMP) and sufficiently kneaded to produce a positive electrode paste. The positive electrode paste was applied to an aluminum foil current collector with a thickness of 20 µm and dried and thereafter, pressing process was carried out to obtain a positive electrode plate. A positive electrode terminal was welded to the positive electrode plate by resistance welding. A nonaqueous electrolyte battery G of Comparative Example 5 was produced in the same manner as in Example 2, except that this positive electrode plate was used.

[Test for Battery Performance]

First, the discharge capacities of the nonaqueous electrolyte batteries F and G were investigated. The investigation was carried out by measuring the capacity obtained in the case charging was carried out to 3.8 V at a constant electric current of 0.1 ItmA and at a constant voltage of 3.8 V for 15 hours in total and then, discharging was carried out to 2.0 V at a constant electric current of 0.1 ItmA. The results are shown in Table 2. From Table 2, it can be understood that the discharge capacity of the nonaqueous electrolyte battery F of the invention was higher than that of the nonaqueous electrolyte battery G.

TABLE 2

|  | Discharge capacity |
|---|---|
| Nonaqueous electrolyte battery F | 151 mAh/g |
| Nonaqueous electrolyte battery G | 136 mAh/g |

The discharge characteristics at respective rates of the nonaqueous electrolyte batteries F and G were investigated. The investigation was carried out by measuring the capacity obtained in the case charging was carried out to 3.8 V at a constant electric current of 0.1 ItmA and at a constant voltage of 3.8 V for 15 hours in total and thereafter, discharging was carried out to 2.0 V at constant electric currents of 0.1, 0.2, 0.5, 1 and 2 ItmA, respectively. The correlation between the capacity retention ratio and the current values obtained as a result is shown in Table 3. The retention ratio was calculated assuming that the capacity obtained at 0.1 ItmA as 100%. The high rate discharge characteristics of the nonaqueous electrolyte battery F of the invention are found excellent as compared with that of the nonaqueous electrolyte battery G.

TABLE 3

|  | Nonaqueous electrolyte battery F | Nonaqueous electrolyte battery G |
|---|---|---|
| Capacity retention ratio at 0.2 ItmA | 95.8% | 93.1% |
| Capacity retention ratio at 0.5 ItmA | 89.0% | 82.4% |
| Capacity retention ratio at 1.0 ItmA | 83.0% | 72.9% |
| Capacity retention ratio at 2.0 ItmA | 75.5% | 62.8% |

The cross section of the lithium iron phosphate F of Example 2 was photographed using a focused ion beam processing observation apparatus (FIB) in the same manner as that in Example 1. The result was found same as that of FIG. 1. Accordingly, the lithium iron phosphate F was found being provided with the carbon layer in the inner walls of the pores. Further, it is confirmed that the carbon layer was intensively distributed on the surface of the $LiFePO_4$ nano-particles. That is, it is confirmed that carbon scarcely existed in the parts of the pores remote from the surface of the $LiFePO_4$ nano-particles and that such parts form large voids.

Figure 3:
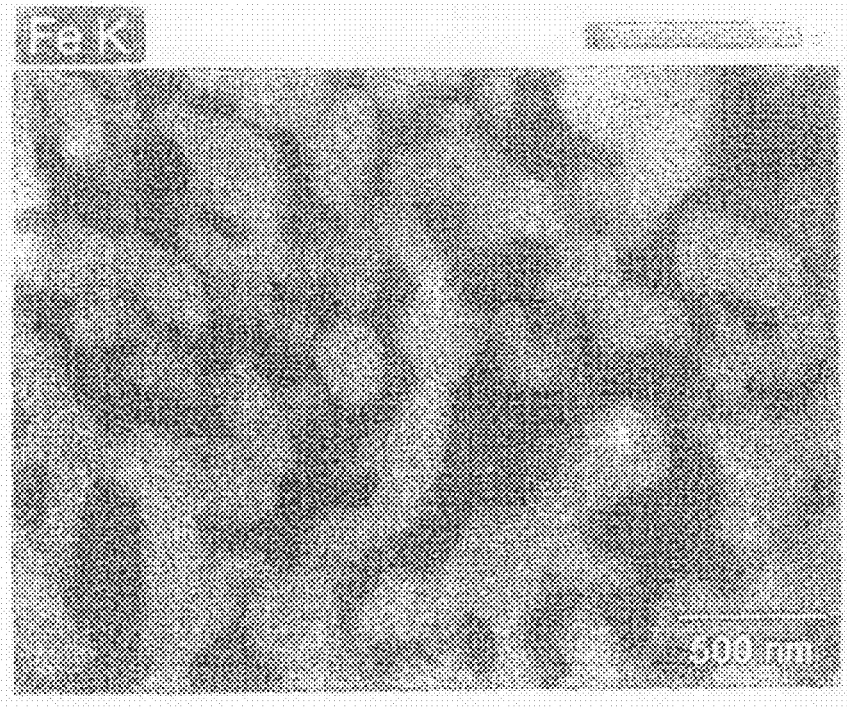
FIG. 3: A transmission electron microscope photograph showing distribution of an iron element in a cross section of the positive electrode material for a nonaqueous electrolyte secondary battery in Example 2.
Figure 4:
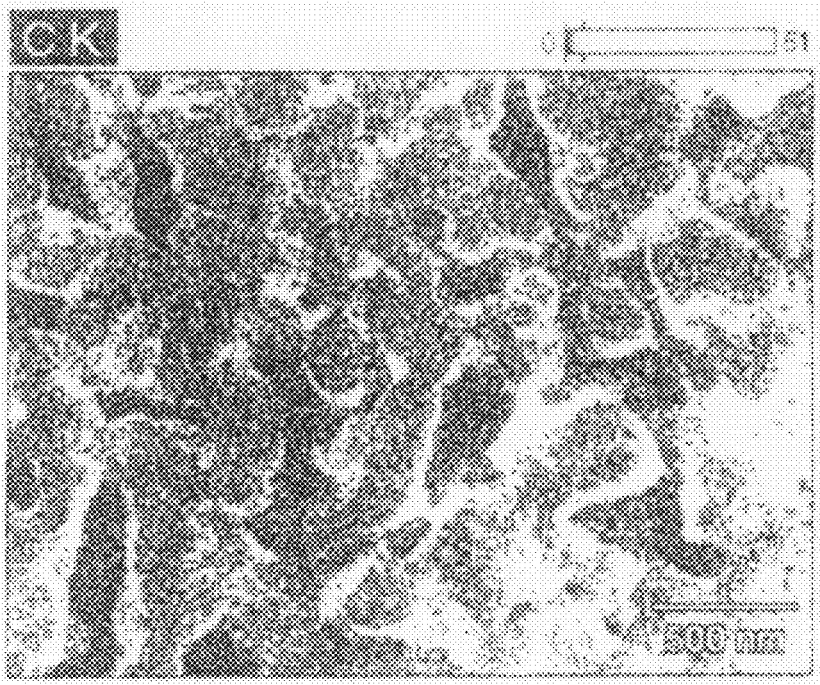
FIG. 4: A transmission electron microscope photograph showing distribution of a carbon element in a cross section of the positive electrode material for a nonaqueous electrolyte secondary battery in Example 2.

Further, with respect to the lithium iron phosphate F of Example 2, after the cross section of a measurement sample was exposed by irradiating a gallium ion beam, the cross section was observed using a transmission electron microscope (TEM). The result is shown in FIG. 3 and FIG. 4. FIG. 3 and FIG. 4 are photographs of the same cross section produced by FIB. FIG. 3 shows distribution of the iron element and the iron element is distributed in the parts seen white in the photograph: that is, the state that the primary particles of $LiFePO_4$ are aggregated is confirmed. FIG. 4 shows distribution of the carbon element and the carbon element is distributed in the parts seen white in the photograph. In comparison of FIG. 3 and FIG. 4, it can be understood that the carbon element is distributed intensively near the surface of the primary particles of $LiFePO_4$ and the carbon element scarcely exists in the parts remote from the $LiFePO_4$ primary particles and large voids exist.

INDUSTRIAL APPLICABILITY

As described above, a nonaqueous electrolyte secondary battery with a high capacity at the time of discharge can be provided by using a positive electrode material for a nonaqueous electrolyte secondary battery which consists of a porous body of a polyanion-containing material and is provided with carbon in layer state in the inner walls of pores of the porous body.

This application is based on Japanese Patent Application (No. 2006-354193) submitted on Dec. 28, 2006 and the content thereof is entirely incorporated in this specification.

The invention claimed is:

1. A positive electrode material for a nonaqueous electrolyte secondary battery comprising a porous body of a polyanion-containing material, wherein said porous body is a secondary particle formed by aggregation of primary particles, in which the primary particles are in direct contact with each other, and wherein inner walls of pores of said porous body are provided with carbon in layer state that forms continuous three-dimensional meshes, and wherein at least a part of the primary particles is not coated with carbon in a starting condition of the primary particles prior to aggregation into the secondary particle.

2. The positive electrode material for a nonaqueous electrolyte secondary battery according to claim 1, wherein said polyanion-containing material is lithium iron phosphate.

3. A nonaqueous electrolyte secondary battery comprising the positive electrode material for a nonaqueous electrolyte secondary battery according to claim 1.

4. The positive electrode material for a nonaqueous electrolyte secondary battery according to claim 1, wherein said carbon is provided in layer state on the inner walls of the pores of the porous body such that the carbon layer is intensively distributed in the inner walls of the pores, but not distributed in the entirety of the pores.

5. The positive electrode material for a nonaqueous electrolyte secondary battery according to claim 1, wherein said continuous three-dimensional meshes, formed by the carbon layer on the inner walls of the pores of said porous body, electrically connect parts of said porous body such that there is no contact resistance in the carbon layer.

6. A method for producing a positive electrode material for a nonaqueous electrolyte secondary battery comprising a porous body of a polyanion-containing material and carbon, wherein the method comprises: forming said porous body as a secondary particle by aggregation of primary particles of the polyanion-containing material, in which the primary particles are in direct contact with each other; and supplying said carbon to the polyanion-containing material in a gaseous source containing at least one of methanol, ethanol, propanol, and butanol in evaporated form, and heating the gaseous source to at least as high as an ignition point of a carbon source in the gaseous source in a manner such that inner walls of pores of said porous body are provided with said carbon in layer state that forms continuous three-dimensional meshes, wherein at least a part of the primary particles is not coated with carbon in a starting condition of the primary particles prior to aggregation into the secondary particle.

7. The method for producing a positive electrode material for a nonaqueous electrolyte secondary battery according to claim 6, wherein said polyanion-containing material is synthesized by a hydrothermal method.

8. The method for producing a positive electrode material for a nonaqueous electrolyte secondary battery according to claim 6, wherein said polyanion-containing material is synthesized by a spray drying granulation method.

9. The method for producing a positive electrode material for a nonaqueous electrolyte secondary battery according to claim 6, wherein said polyanion-containing material is lithium iron phosphate, and the pores of said porous body are provided with the carbon in layer state by heating the gaseous source to at least as high as an ignition point of said at least one of methanol, ethanol, propanol, and butanol contained therein and at most 750° C.

10. The method for producing a positive electrode material for a nonaqueous electrolyte secondary battery according to claim 6, wherein said carbon is provided in layer state on the inner walls of the pores of the porous body such that the carbon layer is intensively distributed in the inner walls of the pores, but not distributed in the entirety of the pores.

11. The method for producing a positive electrode material for a nonaqueous electrolyte secondary battery according to claim 6, wherein said continuous three-dimensional meshes, formed by the carbon layer on the inner walls of the pores of said porous body, electrically connect parts of said porous body such that there is no contact resistance in the carbon layer.

12. A method for producing a positive electrode material for a nonaqueous electrolyte secondary battery comprising a porous body of a polyanion-containing material and carbon, wherein the method comprises the steps of: forming said porous body as a secondary particle by aggregation of primary particles of the polyanion-containing material, in which the primary particles are in direct contact with each other; placing the secondary particle in a firing furnace; and supplying said carbon to the polyanion-containing material in a gaseous source containing at least one of methanol, ethanol, propanol, butanol, and ethylene glycol in evaporated form while heating the firing furnace to a high temperature such that inner walls of pores of said porous body are provided with said carbon in layer state that forms continuous three-dimensional meshes, wherein at least a part of the primary particles is not coated with carbon in a starting condition of the primary particles prior to aggregation into the secondary particle.

* * * * *